April 13, 1954   G. MARTIN   2,674,936
AUTOMATIC CORN POPPING MACHINE
Filed March 29, 1950   7 Sheets-Sheet 1

Fig. 1

INVENTOR.
Gayle Martin
BY
Eugene W. Simpson.
Attorney

April 13, 1954 G. MARTIN 2,674,936
AUTOMATIC CORN POPPING MACHINE
Filed March 29, 1950 7 Sheets-Sheet 2

Fig. 2

INVENTOR.
Gayle Martin
BY Eugene N. Simpson
Attorney

April 13, 1954  G. MARTIN  2,674,936
AUTOMATIC CORN POPPING MACHINE
Filed March 29, 1950  7 Sheets-Sheet 3

INVENTOR.
Gayle Martin
BY Eugene W. Simpson.
Attorney

April 13, 1954 G. MARTIN 2,674,936
AUTOMATIC CORN POPPING MACHINE
Filed March 29, 1950 7 Sheets-Sheet 4

April 13, 1954 G. MARTIN 2,674,936
AUTOMATIC CORN POPPING MACHINE
Filed March 29, 1950 7 Sheets-Sheet 5

INVENTOR.
Gayle Martin
BY Eugene H. Simpson
Attorney

April 13, 1954 — G. MARTIN — 2,674,936
AUTOMATIC CORN POPPING MACHINE
Filed March 29, 1950 — 7 Sheets-Sheet 7

INVENTOR.
Gayle Martin
BY Eugene W. Simpson
Attorney

Patented Apr. 13, 1954

2,674,936

UNITED STATES PATENT OFFICE 2,674,936

AUTOMATIC CORN POPPING MACHINE

Gayle Martin, Milwaukee, Wis.

Application March 29, 1950, Serial No. 152,564

14 Claims. (Cl. 99—238.5)

1

This invention relates to an automatic corn popping machine adapted to pop and deliver the corn in batches.

It has been found in making automatic corn popping machines, particularly those popping the corn in oil, that the time required to pop the corn varies with the initial temperature of the oil as the corn is put into it. That is, the cooler the initial temperature the greater the length of time the corn must remain in the oil in order to become fully popped.

It has been found further that when the unpopped corn is dropped into oil that is too hot, the shell is cracked and full expansion of the kernal is precluded, resulting in small incompletely popped kernels and a resulting poor product.

It is an object of this invention to provide a machine which will pop and deliver popcorn in predetermined quantities.

Another object is to provide a machine to pop popcorn in batches which will deliver the corn when the popping operation is completed.

Another object is to provide an automatic popcorn machine which will reduce the number of unpopped kernels to a minimum.

A further object is to provide an automatic popcorn machine in which the amount of corn popped may be varied.

A further object of the invention is to provide an automatic popcorn machine, popping the corn in oil, in which objectionable odors are eliminated.

A further object is to provide an automatic popcorn machine, popping the corn in oil, in which overheating of the oil is precluded.

A further object is to provide an automatic popcorn machine popping the corn in oil, in which excess oil is drained from the corn prior to delivery to the consumer.

A further object is to provide an automatic popcorn machine, popping the corn in oil, in which excess oil is returned to a supply source.

A still further object is to provide an automatic popcorn machine, popping the corn in oil, in which the machine will shut off upon depletion of either the unpopped corn or oil supply.

A still further object is to provide an automatic popcorn machine in which the popping operation may be viewed by the user.

A still further object is to provide an automatic popcorn machine in which the dumping of the popped corn is controlled by the volume thereof.

A still further object of the invention is to provide an automatic popcorn machine which will

2 preclude corn from becoming lodged between the basket and the heating element.

A still further object is to provide an automatic popcorn machine which cools the oil after each popping operation.

A still further object is to provide an automatic corn popping machine, popping the corn in oil, in which the maximum temperature of the oil is regulated to insure proper popping.

A still further object is to provide an automatic popcorn machine employing a motor to actuate the machine in which the motor is stopped during the popping operation and reactivated when the popped corn reaches a predetermined volume.

A still further object is to provide an automatic popcorn machine which may be easily kept clean and sanitary.

A still further object of the invention is to provide an automatic popcorn machine which will be relatively simple to manufacture.

A still further object of the invention is to provide an automatic popcorn machine which will be relatively free from mechanical breakdowns.

A still further object is to provide a machine which will preclude unpopped corn from being dropped into oil which is at or near a searing temperature.

A still further object is to provide a corn popping machine in which cool oil is supplied to the cooking chamber at the beginning and end of the cooking cycle.

Still further objects of this invention will become apparent upon considering the following specification, which, when taken in conjunction with the accompanying drawings illustrates a preferred form of the invention.

Referring to the drawings, the popcorn machine is housed in a case 15 (Figs. 1 and 2) which is roughly rectangular in shape with a tapered recess 16 in the front. The recess 16 has an opening 17 through which the popped corn is ejected.

The popped corn is received in a hopper 19 in the lower part of the recess 16 directly below the opening 17. The hopper 19 has a door 20 which is normally held closed by a spring 22. A transparent plastic cover 24 is provided for the upper part of the recess 16 above the hopper 19 to enable the purchaser to view the corn during popping. A plastic name plate 25 may be inserted in a slot in the top of the machine.

The popping mechanism is supported in the case 15 on arms 26 which are carried on ledges (not shown) in the case.

Figure 2:
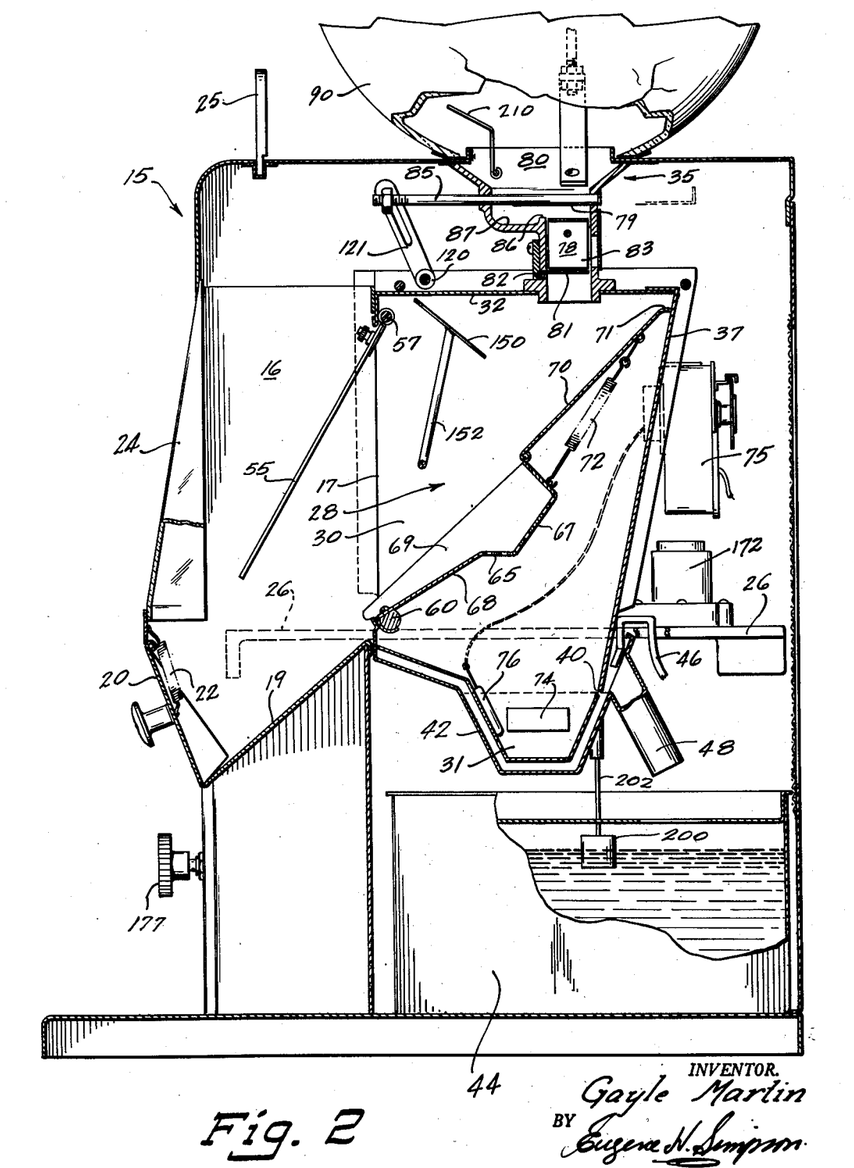
Fig. 2 is a longitudinal cross-section taken on the line 2—2 of Fig. 1, looking in the direction of the arrows, and showing the basket in dumping position.
Figure 3:
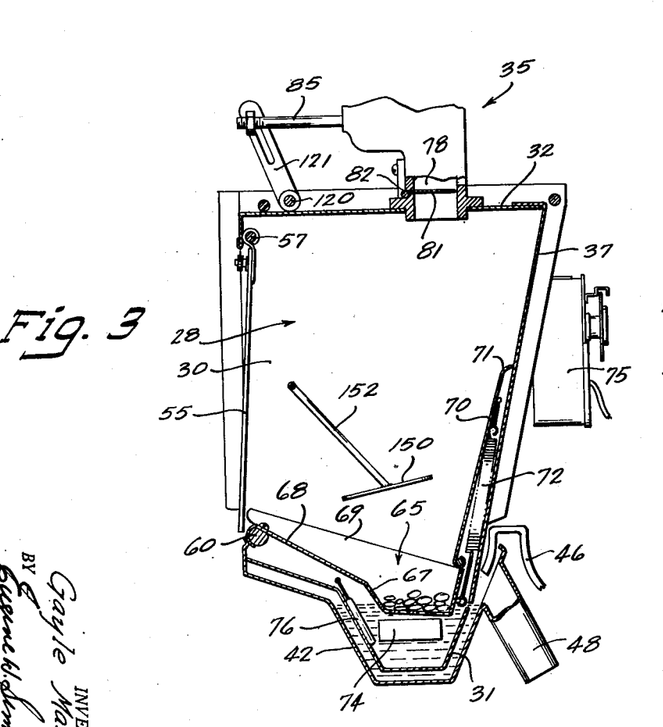
Fig. 3 is a view similar to Fig. 2 showing the popping chamber and basket, with the basket in popping position.
Figure 4:
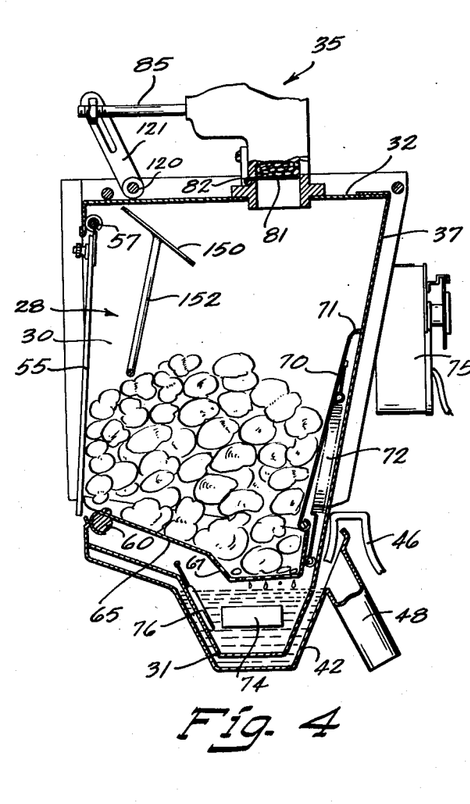
Fig. 4 is a view similar to Fig. 3 but showing the basket in draining position.

The arms 26 support a popping chamber 28 which chamber is best shown in Figs. 2, 3 and 4. Referring to Figs. 2, 3 and 4, the popping chamber 28 is made of a pair of parallel vertical side walls 30—30 having an extension on the lower end to provide a cooking chamber 31.

The side walls 30—30 are joined by a top wall 32 which extends between the side walls and has an opening therein to receive the corn hopper, generally designated 35. The rear of the chamber 28 is enclosed by a rear wall 37 which extends around the bottom to enclose the cooking chamber 31. The wall 37 has a slit opening 40 adjacent the bottom of the chamber 31 to admit oil from a well 42.

The well 42 envelops the lower part of the cooking chamber 31 and receives cool oil pumped by a positive displacement pump 43 (Fig. 5) from an oil reservoir 44 (Fig. 2) through oil pipes 45 and 46. Excess oil returns to the reservoir 44 by gravity through an overflow pipe 48.

The front end of the popping chamber 28 is open and is covered by a glass door 55 which is mounted on a shaft 57. The shaft is mounted to pivot in bearings in the upper edge of the side plates 30 adjacent the front of the machine.

The manner of operating the pump 43 and rotating the shaft 57 to open and close the glass front 55 of the popping chamber 28 will be given in detail below.

A second shaft 60 is mounted to rotate in bearings 62 in the lower part of the popping chamber 28. The shaft 60 carries a popping basket 65.

The popping basket 65 comprises an open top metal basket having openings 67 in the bottom thereof adapted to admit hot oil from the cooking chamber 31. A tray 68 having upturned sides 69 forms the handle for the basket. The tray 68 is secured to the shaft 60 and is adapted to be rotated thereby from a popping position shown in Fig. 3 wherein the bottom of the basket is immersed in the oil in the cooking chamber 31 tto a drain position shown in Fig. 4 in which the basket is entirely out of the oil and thence to a discharge position shown in Fig. 2 in which the popped corn is discharged into the hopper 19.

The popping basket 65 has a plate 70 hinged on the rear end thereof. The plate has a curved upper tip 71 which is in constant contact with the rear wall of the popping chamber 28, being held in contact with the rear wall 37 by a tension spring 72 mounted between the plate 70 and the basket 65.

The basket 65 and plate 70 both extend across the width of the popping chamber so that at no time and under no circumstances can kernels of corn become lodged under the popping basket.

The oil in the cooking chamber 31 is heated by means of a heating coil 74 which is mounted between the bottom portion of the side walls 30—30 in the oil in the cooking chamber 31 directly below the lowest position of the basket 65. The heat supplied to the oil in the cooking chamber is regulated by a thermostat 75 including a thermo-couple 76 in the oil.

Corn is supplied to the popping basket from a measuring hopper, generally designated 35, located above the popping chamber 28 and projecting through the upper wall 32 thereof. The measuring hopper 35 comprises a measuring chamber 78 (see Figs. 9 and 10) having a sliding inlet gate 79 to admit corn to the chamber from a supply chamber 80. A discharge gate 81 is fixed to and pivots with a shaft 82 to discharge the corn into the popping basket 65. A manually adjustable baffle 83 regulates the amount of corn in the measuring chamber.

The gate 79 is mounted on a reciprocable rod 85 and is adapted to move between the corn in the measuring chamber 78 and the corn in the supply chamber 80.

The supply chamber 80 as seen in Fig. 2 is somewhat wider than the measuring chamber 78 and is provided with an upstanding transverse rib 86 extending above the bottom 87 of the supply chamber 80 and below the sliding gate 79.

The provision of the upstanding rib 86 above the bottom of the chamber 80 permits the gate 79 to shut under all conditions while at the same time gives an exact measurement for the corn delivered from the measuring chamber 78.

The upper end of the supply chamber is open and receives corn from a bowl 90 which may be filled with corn to insure a constant supply thereof to the hopper.

Figure 1:
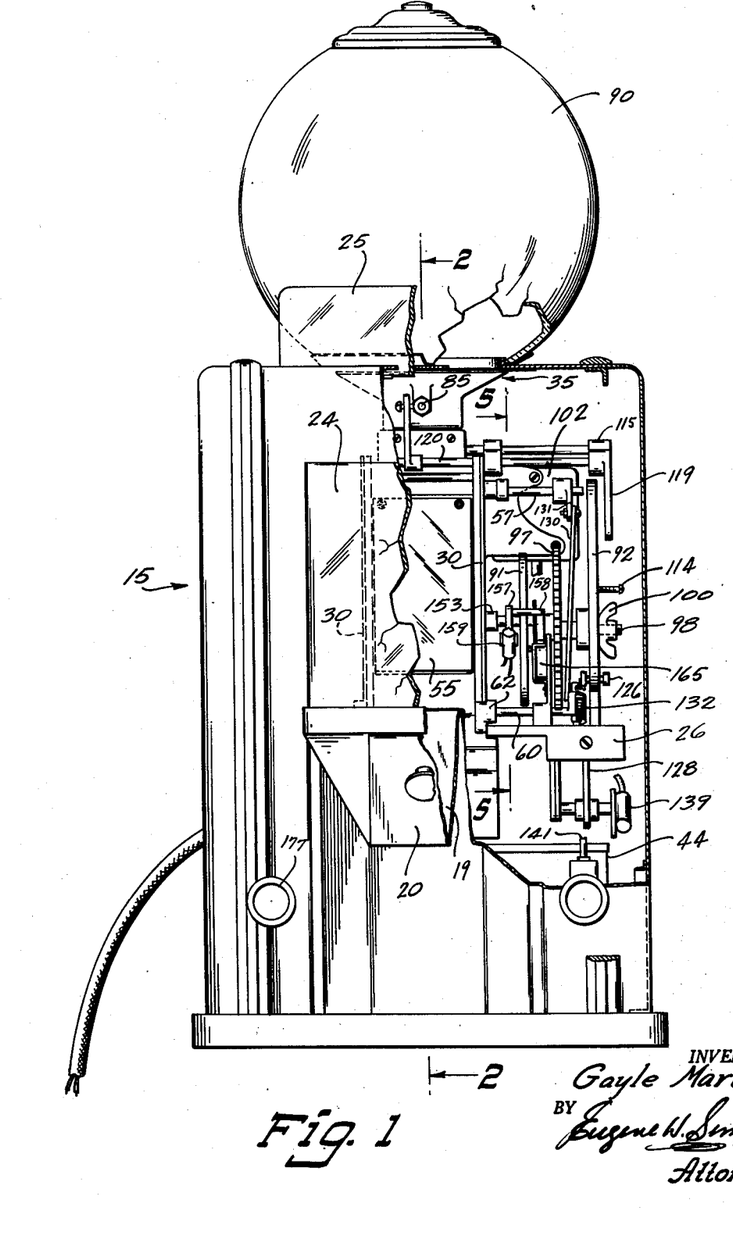
Fig. 1 is a front elevational view of a machine embodying the present invention, parts thereof being broken away to more clearly illustrate certain other parts.
Figures 5, 12, 13:
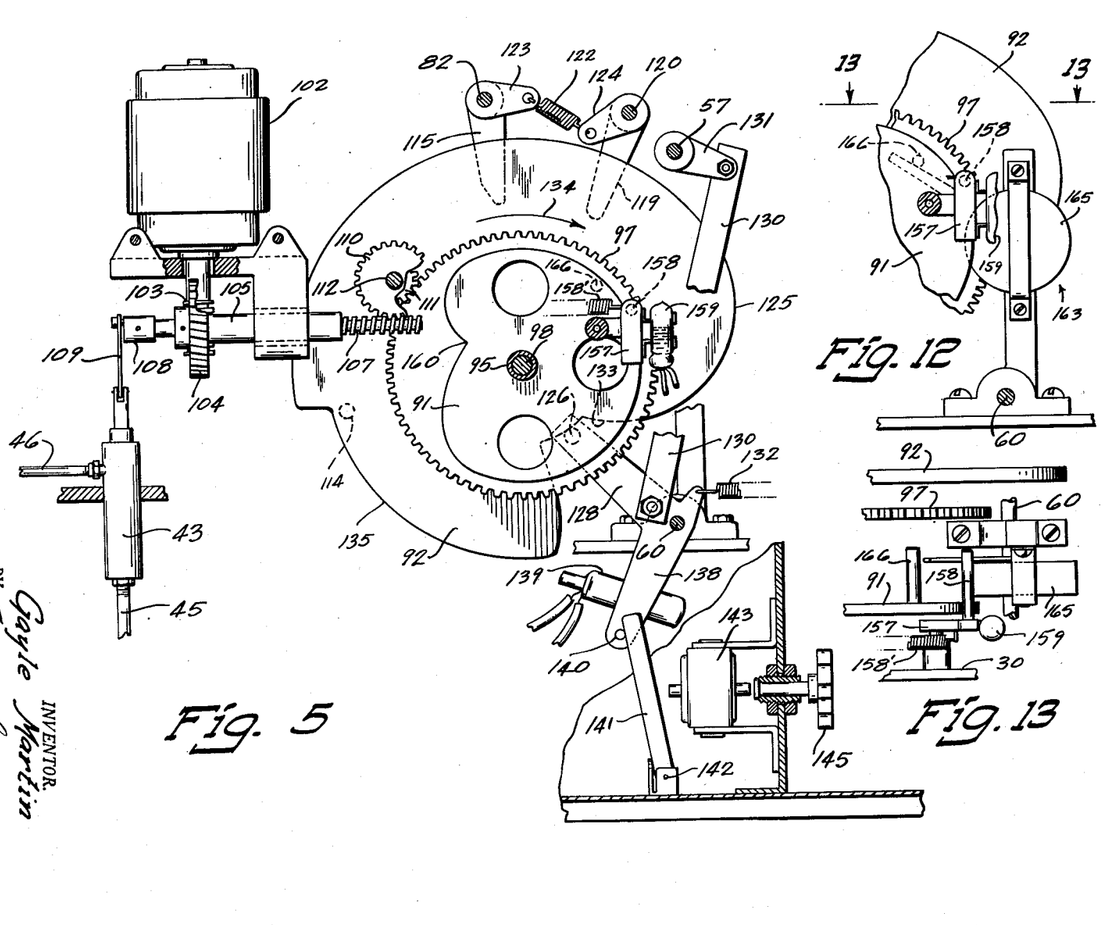
Fig. 5 is a cross-section taken on the line 5—5 of Fig. 1, looking in the direction of the arrows, and showing the operating mechanism.
Fig. 12 is a detail of a safety timer mechanism.
Fig. 13 is a view taken on the line 13—13 of Fig. 12.
Figure 6:
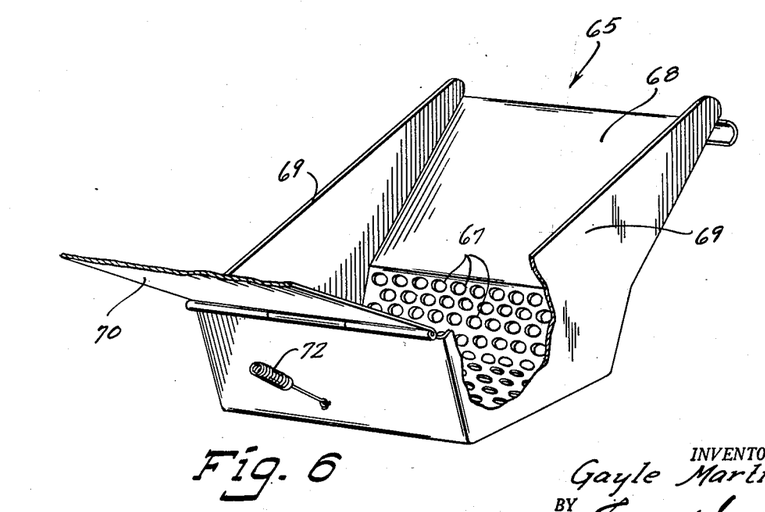
Fig. 6 is a perspective view of the corn popping basket, per se.

The mechanical movements of the machine are all performed by electric motor through the medium of a pair of cams 91 and 92 (see Fig. 5). The cams 91 and 92 are fixed on a common sleeve 95 which also has a driving gear 97 secured thereon between the cams 91 and 92. The cam assembly, including the sleeve 95, the cams 91 and 92 and the driving gear 97, is rotatably mounted on a fixed shaft 98 formed on the outside of the popping chamber 28 and is secured thereon by a nut 100 (Fig. 1).

The cam assembly is driven from a motor 102 mounted at the rear of the popping chamber, and preferably carried by the side wall 30 of that chamber. The motor drives a worm 103 which drives a worm wheel 104 which turns a shaft 105 on one end of which is a worm 107 and on the other end of which is an eccentric 108 which reciprocates the pump 43 through a connecting rod 109.

The worm 107 drives a worm wheel 110 which rotates a gear 111 through a common shaft 112. The gear 111 turns the driving gear 97 which actuates the cams 91 and 92.

The outside cam 92, which is somewhat larger than the inside cam 91, controls emptying of the corn hopper 35 and the refilling thereof through a pin 114 which is fixed on the outside of the cam 92 and rotates about the shaft 98 with the cam. The pin 114 contacts a lever 115 fixed on the shaft 82 to rotate the shaft 82. Upon rotation of the shaft 82 the gate 81, which is fixed to the shaft 82, opens to allow corn in the measuring chamber 78 to drop into the popping basket 65.

The pin 114 also moves a second lever 119 to rotate a shaft 120. Rotation of the shaft 120 moves a lever 121 which actuates the rod 85 to open the sliding gate 79 to refill the measuring chamber 78. A tension spring 122 connected between arms 123 and 124 on the levers 115 and 119, respectively, constantly urges the gates 81 and 79 into closed positions.

The cam element 92 has a cam surface, generally designated 125, on the periphery thereof. A cam follower 126 rides on the cam surface 125 to actuate a lever 128. The lever 128 is fixed on the shaft 60 so that movement of the lever 128 rotates the shaft 60 to move the popping basket 65.

The lever 128 has a link 130 pivoted thereto which actuates a lever 131 fixed to the shaft 57, so that movement of the lever 128 also rotates the shaft 57 to open and close the glass door 55 to the popping chamber 28. A spring 132 constantly urges the cam follower 126 toward the center of the cam 92.

The combined action of the lever 128 upon the popping basket 65 and the glass door 55, as the cam rotates, is to move the basket from its discharge position and the door 55 from its open position at the start of the operation with the follower 126 in a recess 133 to positions where the basket 65 is in popping position in the oil and the door 55 is closed, as the cam moves in the direction of the arrow 134 (Fig. 5). As the follower 126 drops onto the intermediate portion 135 of the cam 92 the door 55 is retained substantially closed and the basket 65 is lifted out of the oil to drain excess oil from the corn. When the follower 126 again drops into the recess 133, the door 55 is opened by the link 130 and at the same time the basket 65 is snapped to discharge position (as seen in Fig. 2) causing the corn to fall into the hopper 19.

The lever 128 has an arm 138 formed thereon which arm 138 carries a mercury tube switch 139 and a pin 140. The switch 139 is adapted to move to "on" or closed position as the follower 126 is moved away from the shaft 98 by the rotation of the cam 92 and to "off" or open position as the cam follower 126 drops into the recess 133. The switch 139 remains closed during the time the follower 126 is riding on the intermediate portion 135 of the cam 92.

The pin 140 is adapted to contact a lever 141 which lever is pivoted at 142, to force the lever into contact with a switch 143 to open the latter switch after the mercury switch 139 closes. The switch 143 is closed to start the operation of the machine by pressing a button 145 on the outside of the casing 15.

The second cam 91 is adapted to cooperate with an umbrella 150 (Figs. 2, 3 and 4) to control the operation of the motor during the popping. The umbrella 150 is carried within the popping chamber 28 by a rod 152 which passes through a horizontal bearing 153 in the side 30 of the popping chamber 28 and bends downward to carry the umbrella 150 adjacent the lower central portion of the popping chamber (Fig. 3) during popping.

Outside the popping chamber the rod 152 receives a block 157 (Fig. 5) to which it is affixed. The block 157 has a cam follower 158 which contacts the outer peripheral surface of the cam 91. The follower 158 is maintained in constant contact with the cam 91 by a spring 158' the other end of which is connected to a portion of the popping chamber 28. The block 157 carries a mercury switch 159 which is connected in series with the switch 139 so that when current is interrupted through either switch 139 or 159 the motor 102 stops.

At the beginning of the operation the follower 158 is riding on a high point in the cam 91, as shown in Fig. 5, and the umbrella 150 is raised to the top of the popping chamber 28 as seen in Figs. 2 and 4. In this position the switch 159 is closed. The switch 159 remains closed until the cam 91 rotates to a low point 160 at which time the rotation of the block 157 has rotated the rod 152 causing the umbrella 150 to lower to a position shown in Fig. 3.

When the follower 158 reaches this low point 160 the block 157 has rotated through an angle sufficient to open the switch 159 and stop the motor 102. The motor remains stopped during substantially the entire popping operation.

In normal operation when the corn in the popping basket 65 is completely popped, it raises the umbrella 150 sufficiently to rotate the block 157 enough to close the switch 159 to reactivate the motor. It has been found, however, as a safety measure only, to be very desirable to limit the time which the corn may remain in the hot oil. For that purpose a standard 163 is mounted on the arm 26 and carries a time clock 165. The clock is wound by a pin 166 projecting from the side of the cam 91 and is adapted to contact the follower 158 to close the switch 159 at the end of the predetermined time period in the event that the popping corn does not effect that function.

Figure 11:
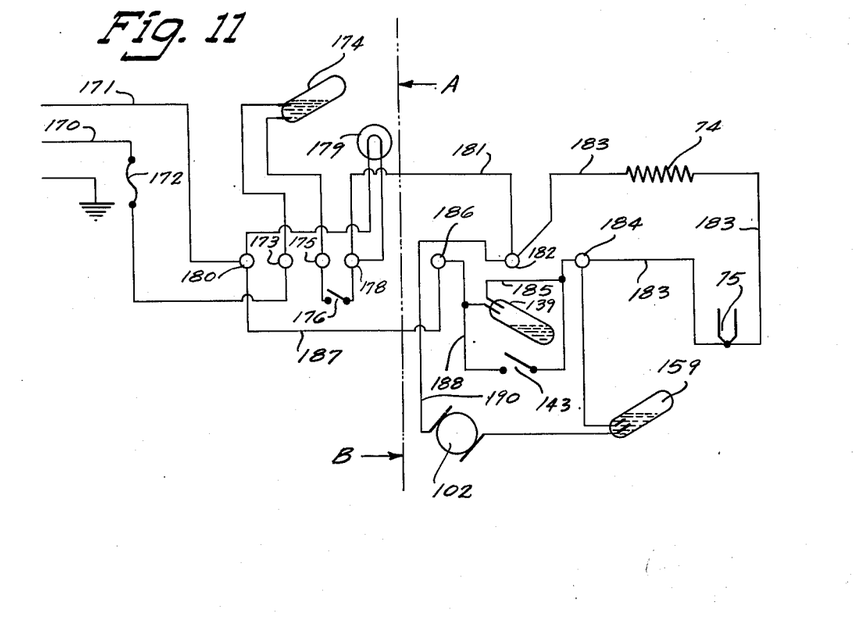
Fig. 11 is a wiring diagram showing electrical connections of the entire machine.

The electrical connections for the entire machine are shown in Fig. 11. The power comes into the machine through a pair of wires 170—171 and passes through a fuse 172 in the line 170. From the fuse 172 the power goes through a binding post 173 through a safety switch 174 which may be a mercury switch for convenience, thence through a second binding post 175 and through a main switch 176 which is preferably a snap switch actuated by a button 177 (Fig. 2) on the front of the machine. The power is then delivered to a binding post 178. From the binding post the power passes through a light 179, thence to a binding post 180 to complete the circuit through the wire 171. The specific method of operating the switch 174 will be given in detail below.

All the electrical equipment heretofore described in connection with Fig. 11 lies to the left of the line A—B and is situated on the left hand side of the machine. The following electrical equipment shown on the right of the line A—B is located on the right hand side of the machine.

From the binding post 178 a line 181 leads from the left hand side of the machine to a binding post 182 on the right hand side of the machine.

A power line 183 leads from the binding post 182 to the heating coil 74 thence to the thermostat 75 to a binding post 184. From the binding post 184 the current travels through a line 185 and through the switch 139 actuated by the cam 92 to a binding post 186. From the binding post 186 the current travels through the line 187 to the binding post 190 and thence to the line 171 to complete the circuit. Thus as long as the switch 139 is closed current flows through the heating coil 74, and conversely when the switch 139 opens power is cut off from the heating element 74. The switch 139 has a switch 143 shunted around it through a line 188 so that when either switch 139 or 143 is closed, current passes between the binding posts 184 and 186.

It will also be noted that power to the heating coil 74 is controlled by the thermostat 75 in such a manner as to limit the temperature of the oil to a predetermined maximum.

A second power line 199 from the binding post 182 leads to the motor 102 thence through the mercury switch 159 on the cam 91 to the binding post 184. From the binding post 184 the current must pass through either the switch 139 or 143 to return through the line 187 to the line 171. It will thus be apparent that the switches 139 and 159 are in series with the motor 102 and hence both switches 159 and 139 or the switches 159 and 143 must be closed in order to actuate the motor 102.

Figures 7, 8:
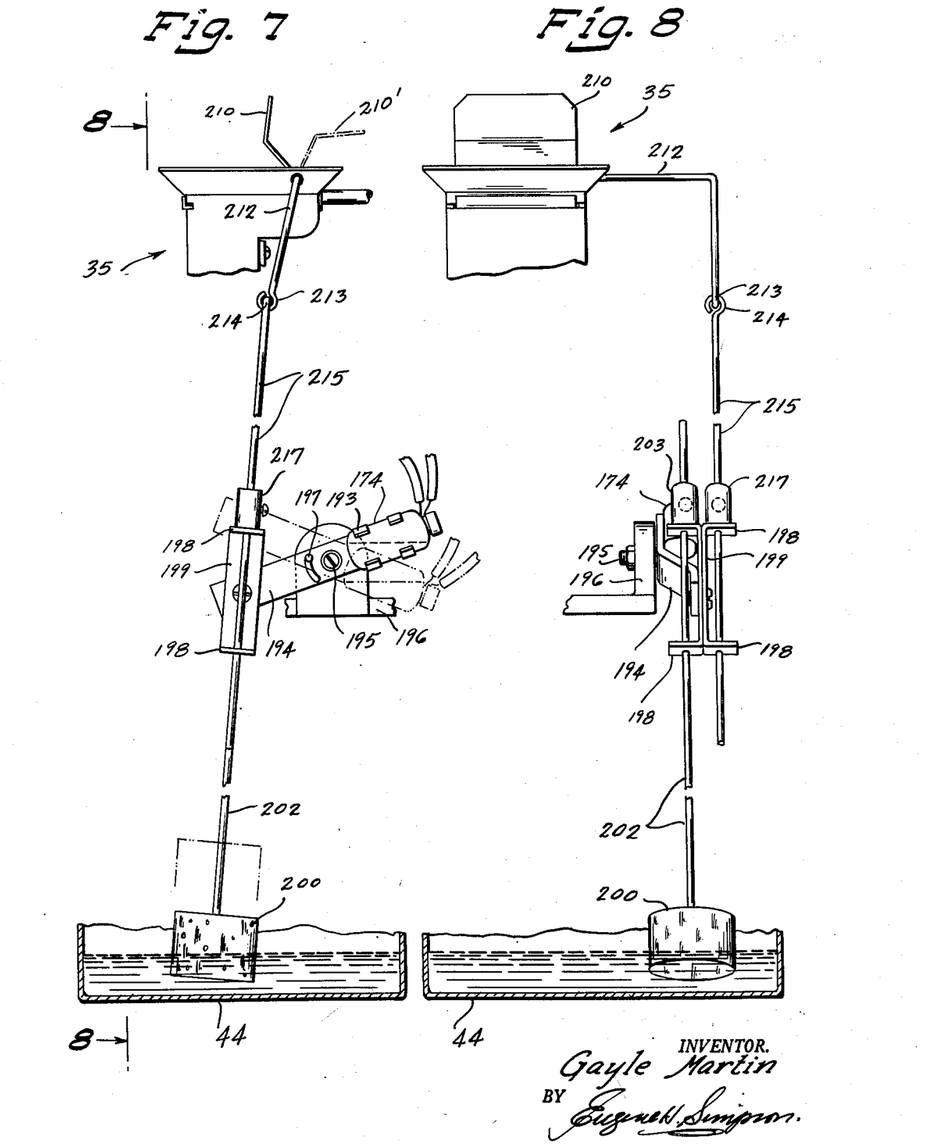
Fig. 7 is a detail of the safety cutoffs used to shut down the machine upon depletion of oil or corn supplies.
Fig. 8 is a view taken on the line 8—8 of Fig. 7, looking in the direction of the arrows.

Referring to Figs. 7 and 8 for details of the safety switch 174, it will be seen that the mercury tube switch 174 is carried in clips 193 formed on a metallic strip 194. The strip 194 is pivoted at 195 to a bracket 196 so that the weight of the tube 174 tends to cause that end of the switch to drop down into closed position. The rotative movement of the switch 174 about the pivot 195 is limited by a stop 197.

The end of the strip 194 has an H-shaped bracket, comprising a pair of parallel legs 198—198 and a vertical cross piece 199, pivoted to it at the center of the cross piece 199.

A float 200 in the tank 44 has a rod 202 attached thereto which passes through holes in both legs 198—198 on one side of the cross piece 199. The rod 202 has a weight 203 (Fig. 8) attached thereto which is adapted to contact the top of the leg 198 as the level of the oil drops and raise the mercury tube 174 to open the switch.

In order to stop the action of the machine when the supply of corn in the bowl 90 gets too low, a paddle 210 is mounted in the entrance of the supply hopper. The paddle 210 is pivotally mounted on a rod 212 which extends horizontally through the side of the hopper 35 and is bent down and provided at its lower end with a hook 213.

The hook is engaged in an eye 214 on a rod 215. The rod 215 depends from the hook and passes through a pair of holes in the opposite sides of the legs 198—198 from the rod 202. A weight 217 is secured to the rod and is adapted to contact the top of the leg 198 in the event the level of corn in the hopper 35 becomes too low.

In practice the paddle 210 is held in the dotted line position 210′ by the weight of corn on top of it, and moves to the solid line position 210 under the influence of the weight 217 when the weight of the corn is removed. Pressure of the weight 217 on the top of the leg 198 rotates the tube 174 counter-clockwise to open the switch and cut off all current to the machine.

It will thus be seen that either a deficiency of oil or corn will cause a shut down of the machine.

*Operation*

At the beginning of the operation the switches 139, 143, 159 and 176, the popping basket 65 and the glass door 55 are in the position shown in Figs. 2 and 5 and the electrical connections are as shown in Fig. 11.

To start the machine the knob 177 is turned, closing the main snap switch 176. If there is corn in the bowl 90 and oil in the tank 44, the safety switch 174 will be closed and the light 179 will then light. The machine is then "live" but does not start operation since both the switches 139 and 143 are open, preventing current from reaching either the motor 102 or the heating coil 74.

When it is desired to pop a batch of corn the switch 143 is closed by pressing the button 145 inwardly thus completing the circuit through the switch 143 to the coil 74 and to the motor 102. This starts the coil heating to heat the oil in the cooking chamber 31. At the same time the motor 102 starts, pumping oil from the tank 44 through the pipe 45, through the pump 43, through the pipe 46 and into the well 42, excess oil draining out the overflow pipe 48 and back into the tank 44. As the oil is pumped to the well 42 a portion of the oil in the well enters the cooking chamber 31 through the slot 40 to form a coolant at the ends of the cycle.

Simultaneously with the heating of the oil the motor turns the cams 91 and 92 on the shaft through the train of gears including 103, 104, 107, 110, 111 and 97.

As the cams 91 and 92 turn in the direction of the arrow 134, shown in Fig. 5, the follower 126 moves outwardly moving the arm 138 to the right as seen in Fig. 5, causing the slope of the tube to reverse and the mercury in the tube 139 to close the switch. After the switch 139 is closed the pin 140 then contacts the lever 141 to move that lever into contact with the button of the switch 143 to open that switch. From this point the switch 139 carries the current in place of the switch 143.

The movement of the cams 91 and 92 moves the lever 126 counter-clockwise, as seen in Fig. 5, to rotate the main shaft 60 causing the popping basket 65 to move down into the oil. As the basket moves down into the oil the link 130 moves down rotating the shaft 57 to close the glass door 55 which is secured to the shaft 57.

As the cams 91 and 92 continue to rotate, the pin 114 contacts the lever 115 and its shaft 82 to rotate them counter-clockwise, as seen in Fig. 5, or clockwise as seen in Figs. 2, 3 and 4, to open the gate 81 (Figs. 2, 3, 4 and 9) and allow corn in the measuring chamber 78 to drop down into the lowered basket 65. After the pin 114 passes the lever 115, the spring 122 returns the lever to its original position, closing the gate 81, leaving the measuring chamber 78 empty, and ready for refilling. It will be noted that the plate 76 by remaining in constant contact with the rear wall 37 and the rear edge of the basket 65 precludes the possibility of corn from the measuring chamber 78 falling behind the basket 65 or the popping corn in the basket from becoming wedged behind the basket.

After the corn is dropped into the basket 65 from the measuring chamber 78, the follower 158 begins to move in toward the low point 160 on the cam 91, which movement turns the rod 152 and lowers the umbrella 150 to the position shown in Fig. 3. When the umbrella is fully lowered as seen in Fig. 3, the follower 158 has reached the low point 160 in the cam 91, reversing the slope of the mercury switch 159 to cause the mercury therein to run to the opposite end of the tube and open the switch. Opening the switch 159 opens the circuit through the motor 102 causing the motor to stop. Stopping of the motor 102 stops both the pumping of oil through the pump 43 and the stopping of both cams 91 and 92.

At the time the cams 91 and 92 stop, due to opening of the switch 159, the pin 114 has released the lever 115 and has not yet contacted the arm 119, the pin 114 thus being positioned between the two levers 115 and 119.

The heating coil 74 which has been heating since the closing of the switch 143 at the beginning of the operation, continues to heat the oil in the cooking chamber 31, thus popping the corn. Shoud the oil get above the desired popping temperature the thermo-couple 76 cuts off current to the coil without affecting the motor circuits and so prevents overheating of the oil.

When the corn is substantially popped, the expansion causes the corn to raise the umbrella slightly causing the switch 159 to rotate on its pivot independently of the cam 91 and closes the switch, reactivating the motor 102. The operation of the motor 102 starts the cams 91 and 92 rotating, at which time the cam 91 picks up the follower and rotates the switch 159 clockwise, as seen in Fig. 5, turning the pivotal rod 152 and raising the umbrella to the position shown in Figs. 2 and 4.

Figure 9:
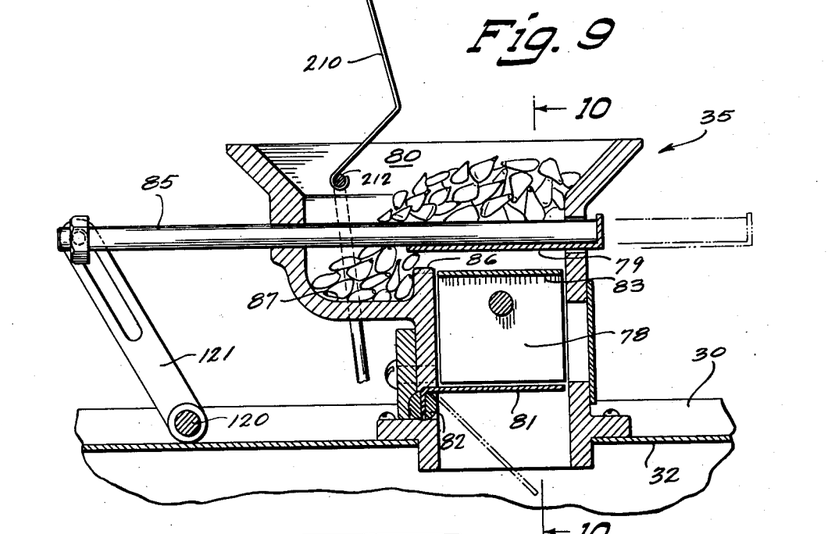
Fig. 9 is an enlarged detail of the corn feed hopper per se and is an enlarged cross-section taken on the line 2—2 of Fig. 1.
Figure 10:
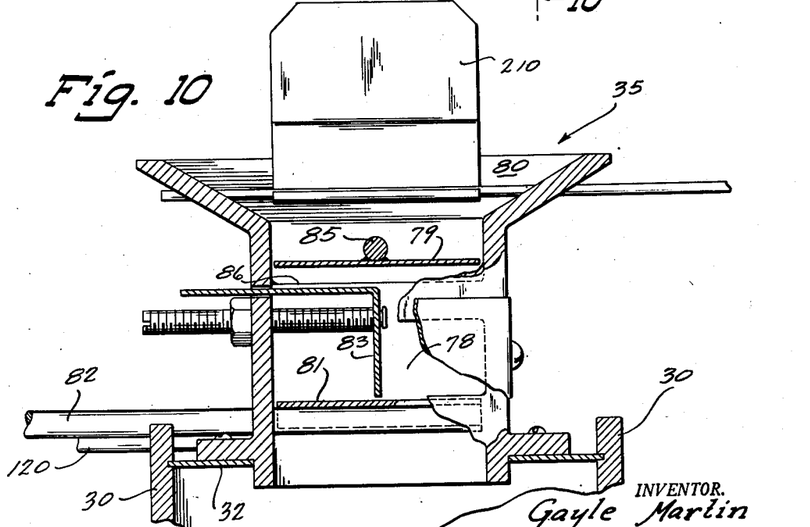
Fig. 10 is a cross-section taken on the line 10—10 of Fig. 9, looking in the direction of the arrows.

At the same time as the umbrella 150 is being lifted by the cam 91, the cam 92 also rotates and the pin 114 contacts the lever 119 rotating the lever 119 and its shaft 120 counterclockwise, as seen in Fig. 5, or clockwise as seen in Fig. 9, causing the lever 121 (Fig. 9) to move the rod 85 to the right and open the gate 79. Opening the gate 79 causes corn from the hopper 80 to flow down and refill the measuring chamber 78.

As the pin 114 moves past the lever 119 the spring 122 causes rotation of the shaft 120 in the opposite direction closing the gate 79 with the measuring chamber 78 full. It will be noted that the spacing of the gate 79 above the lip 86 assures the gate 79 closing under all conditions.

In the rotation of the cam 92 about the shaft 98 the follower 126 rides on the cam surface 125 until the step comes opposite the follower at which time the follower 126 drops onto the cam surface 135. This drop of the cam follower 126 onto the surface 135 occurs as the umbrella is rising due to the rotation of the pivotal rod 152.

The movement of the follower 126 toward the center of the cam 92 causes a rotation of the shaft 60 clockwise, as seen in Fig. 5, which raises the basket out of the oil and into the position shown in Fig. 3, allowing the excess oil to drain from the corn. This slight rotation of the lever 128 and the shaft 60, while it does open the glass door 55 slightly, has very little effect upon it and the door remains substantially shut during this period.

When the cam rotates sufficiently to drop the follower 126 into the recess 133 the popping basket 65 is rotated and stopped with a snap at the same time the glass door 55 opens to eject all the corn from the basket into the hopper 19.

Corn is removed from the hopper by opening the gate 20 and permitting the corn to slide out by gravity.

In the event that excess oil is retained on the basket after the draining and runs down the tray 68 it follows around the shaft 60 and is returned to the oil well 42 for reuse.

It will be realized that the hereinbefore described form of the invention is merely a preferred embodiment thereof and that various changes in size, shape and arrangement of parts may be made without departing from the spirit of the invention or the scope of the subjoined claims.

That which is claimed as new and is desired to be secured by United States Letters Patent is:

1. An automatic corn popping machine of the character described comprising, a popping basket, a motor mounted adjacent the popping basket, a cam actuated by said motor, a cam follower engaging said cam and adapted to move the basket into and out of popping position, a first switch, means to actuate said switch to start the motor and move the basket into popping position, a second switch, means to actuate said second switch to stop the motor when the basket is in popping position, means actuated by said motor to deliver a measured quantity of corn to said basket, means to pop the corn in the basket, and means actuated by the expansion of the popping corn to reactivate the motor to remove the basket from popping position and expel the popped corn therefrom.

2. An automatic corn popping machine of the character described comprising, a popping basket, a motor mounted adjacent the popping basket, a cam actuated by said motor, a cam follower engaging said cam and adapted to move the basket into and out of popping position, a first switch, means to actuate said switch to start the motor and move the basket into popping position, a second switch, means to actuate said second switch to stop the motor when the basket is in popping position, a corn hopper mounted above said basket, means actuated by said cam to deliver a measured quantity of corn from said hopper to said basket, means to pop the corn in the basket, and means actuated by the expansion of the popping corn to reactivate the motor to remove the basket from popping position and expel the popped corn therefrom.

3. An automatic corn popping machine of the character described comprising, a popping basket, a motor mounted adjacent the popping basket, a cam actuated by said motor, a cam follower engaging said cam and adapted to move the basket into and out of popping position, a switch adapted to start the motor to move the basket into popping position, a switch adapted to stop the motor when the basket is in popping position, means actuated by said motor to deliver a measured quantity of corn to said basket, a heating coil beneath the basket when said basket is in popping position, an electric circuit including the first named switch to supply current to the coil to pop the corn, and to maintain the current on independently of said second named switch, means activated by the expansion of the corn to reactivate the motor to move the basket out of popping position and expel the popped corn, and means to open the first named switch to stop the motor and de-energize the coil simultaneously.

4. An automatic corn popping machine of the character described comprising, an oil container, a popping basket, means to lower the basket into the oil, means to deliver a measured quantity of unpopped corn to said basket when the basket is in the oil, means to heat the oil to pop the corn, means operable upon the popped corn attaining a predetermined height in the basket to raise the basket and hold it above the oil to drain excess oil from the corn, and means to dump the popped corn from the basket after draining the excess oil.

5. An automatic corn popping machine of the character described comprising, an oil container, a popping basket, a motor adapted to lower the basket into the oil in the container and to raise the basket from the oil after the completion of the popping cycle, means to actuate the motor to lower the basket into the oil, means to shut off the motor when the basket is in the oil, means including said motor to deliver a measured quantity of unpopped corn to said basket while the basket is in the oil, means to heat the oil to effect popping of the corn, and means to reactivate the motor when the popped corn has attained a predetermined height in the basket to remove the basket from the oil.

6. An automatic corn popping machine as defined in claim 5 including means to cool the oil in the container at the conclusion of the popping cycle.

7. An automatic corn popping machine of the character described comprising, an oil container, a popping basket, means to lower the basket into the oil, means to deliver a measured quantity of unpopped corn to said basket, means to heat the oil and effect popping of the corn, means operable upon the popped corn reaching a predetermined height in the basket to raise the basket from the oil and deliver the popped corn and means to cool the oil in said container at the conclusion of the popping cycle.

8. An automatic corn popping machine of the character described comprising, an oil container, a popping basket, means to lower the basket into the oil, means to deliver a measured quantity of unpopped corn to said basket, means to heat the oil and effect popping of the corn, a thermostatic control in the oil to limit the temperature of the oil to a predetermined maximum, means operable upon the popped corn reaching a predetermined height in the basket to raise the basket from the oil and deliver the popped corn and means to cool the oil in said container at the conclusion of the popping cycle.

9. An automatic corn popping machine of the character described comprising, an oil container, a popping basket, a motor adapted to lower the basket into the oil in the container and to raise the basket from the oil after the completion of the popping cycle, means to actuate the motor to lower the basket into the oil, means to shut off the motor when the basket is in the oil, means including said motor to deliver a measured quantity of unpopped corn to said basket while the basket is in the oil, means to heat the oil to effect popping of the corn, a thermostatic control element in the container adapted to limit the temperature of the oil to a predetermined maximum and means to reactivate the motor when the popped corn has attained a predetermined height in the basket to remove the basket from the oil.

10. An automatic corn popping machine of the character described comprising, an oil container, a popping basket, a motor adapted to lower the basket into the oil in the container and to raise the basket from the oil after the completion of the popping cycle, means to actuate the motor to lower the basket into the oil, means to shut off the motor when the basket is in the oil, means including said motor to deliver a measured quantity of unpopped corn to said basket while the basket is in the oil, means to heat the oil to effect popping of the corn, a thermostatic control element in the container adapted to limit the temperature of the oil to a predetermined maximum, means to reactivate the motor when the popped corn has attained a predetermined height in the basket to remove the basket from the oil and means to cool the oil in the container at the conclusion of the popping cycle.

11. An automatic corn popping machine, adapted to pop a batch of corn on each cycle, comprising, an oil container, an oil reservoir adjacent said container, a pump adapted to supply cool oil from the reservoir to said container at the beginning and end of the cycle, a motor, means connecting the motor with the pump to actuate the latter, a popping basket adapted to move into and out of said oil, means actuated by said motor to move the basket into the oil, means actuated by said motor to deliver a predetermined quantity of corn to said basket when the latter is in the oil, means to heat the oil to effect popping of the corn, means to stop the motor during popping of the corn, means to reactivate the motor when the popped corn in the basket reaches a predetermined height to raise the basket out of the oil to deliver the popped corn from the basket.

12. An automatic corn popping machine adapted to pop a batch of corn on each cycle, comprising, a rectangular housing including parallel side walls, a back wall and a top wall, a heating unit located in the bottom of said housing, a popping basket fitting between the side walls of the housing, means pivotally mounting said basket on the forward edge of the housing whereby said basket is movable between a corn ejecting position and a popping position adjacent said heating unit, means in the top wall of the housing to supply unpopped corn to the basket when it is in popping position, a plate extending between said side walls and bearing against the back wall at the upper end thereof, and means pivotally securing the lower edge of the plate to the inner edge of the basket.

13. An automatic corn popping machine adapted to pop a batch of corn on each cycle, comprising, a rectangular housing including parallel side walls, a back wall and a top wall, a heating unit located in the bottom of said housing, a popping basket fitting between the side walls of the housing, means pivotally mounting said basket on the forward edge of the housing whereby said basket is movable between a corn ejecting position and a popping position adjacent said heating unit, means in the top wall of the housing to supply unpopped corn to the basket when it is in popping position, a plate extending between said side walls and bearing against the back wall at the upper end thereof, means pivotally securing the lower edge of the plate to the inner edge of the basket, and means retaining the upper edge of the plate against the rear wall of the housing.

14. An automatic corn popping machine adapted to pop a batch of corn on each cycle, comprising, a rectangular housing including parallel side walls, a back wall and a top wall, a heating unit located in the bottom of said housing, a popping basket fitting between the side walls of the housing, means pivotally mounting said basket on the forward edge of the housing whereby said basket is movable between a corn ejecting position and a popping position adjacent said heating unit, means in the top wall of the housing to supply unpopped corn to the basket when it is in popping position, a plate extending between said side walls and bearing against the back wall at the upper end thereof, means pivotally securing the lower edge of the plate to the inner edge of the basket and a tension spring mounted between the rear of said plate and the rear of said basket to constantly retain the upper edge of the plate in engagement with the back wall of the housing.

References Cited in the file of this patent

UNITED STATES PATENTS

| Number | Name | Date |
|---|---|---|
| Re. 20,570 | Bushway | Dec. 7, 1937 |
| 525,347 | La France | Sept. 4, 1894 |
| 1,234,131 | Cleveland | July 24, 1917 |
| 1,477,704 | Holcomb et al. | Dec. 18, 1923 |
| 1,789,902 | Jackson | Jan. 20, 1931 |
| 1,808,758 | Bettandorff | June 8, 1931 |
| 1,844,260 | Nicolino | Feb. 9, 1932 |
| 1,961,812 | Burch | June 5, 1936 |
| 2,034,484 | Pagendarm | Mar. 17, 1936 |
| 2,078,719 | Roach | Apr. 27, 1937 |
| 2,113,091 | Mills | Apr. 5, 1938 |
| 2,134,088 | Obdyke | Oct. 25, 1938 |
| 2,175,531 | Kortum | Oct. 10, 1939 |
| 2,222,314 | Rusk | Nov. 19, 1940 |
| 2,546,163 | McBeth | Mar. 27, 1951 |
| 2,587,338 | Lee et al. | Feb. 26, 1952 |